Patented Sept. 5, 1950

2,521,614

UNITED STATES PATENT OFFICE 2,521,614

INVESTMENT COMPOSITIONS AND METHOD OF PRODUCING REFRACTORY MOLDS THEREFROM

Ilsabe E. Valyi, Coldwater, Mich., assignor to Emerik Imre Valyi, New York, N. Y.

No Drawing. Application January 30, 1946, Serial No. 644,420

24 Claims. (Cl. 22—188)

This invention relates to the precision casting of metals. More particularly, it relates to new and improved investment compositions for the production of refractory molds and to the method of preparing such refractory molds.

Metal castings have been made by forcing metal or alloy, by either hydrostatic pressure or centrifugal pressure, into a mold made from a refractory material, such as sand, lime, silica, zirconia, alumina, etc., or mixtures thereof. The mold was usually made by either the lost wax process or the plaster molding process. In the lost wax process, a slurry of the desired refractory material or mixture thereof and of heavy consistency was poured around a wax pattern and, after the refractory had acquired sufficient strength upon setting, the wax pattern was melted and removed (hence the name lost wax process). The set refractory was finally fired whereby it was brought into final shape and condition to be used as the mold for precision metal casting. In the permanent pattern method utilizing plaster molds, a slurry of the previously mentioned type was poured into or against a pattern formed of a permanent material and, after setting of the refractory composition, the pattern was removed and the mold fired to bring it into final shape and condition for use as a mold for metal casting.

The setting of high-refractory investment compositions takes an appreciably long period of time, such as over an hour. Attempts have been made to accelerate the time for setting by incorporating in high-refractory investment compositions highly active ingredients. Such investment compositions were unsatisfactory in that the added active ingredients caused chemical reactions which deleteriously affected the final mold. For example, some of the highly active ingredients which were added to the investment compositions caused chemical reactions resulting in the evolution of gases within the refractory mass, with the consequence that undesirable holes and bubbles were produced in the casting surface, and such casting surface could not be utilized in the precision casting of metals where smooth uniform surfaces were desired.

An object of this invention is to provide a new and improved investment composition.

Another object of this invention is to provide an investment slurry, the setting time of which can be varied and predetermined.

An additional object of this invention is to provide an investment slurry which will set rapidly at low temperatures.

A further object of this invention is to provide a method of making refractory molds from the aforementioned investment slurries.

Other and additional objects of this invention will become apparent hereinafter.

The above objects are accomplished, in general, by homogeneously incorporating a low temperature bonding agent in an investment composition of the usual type and which comprises an aqueous slurry of particles of a refractory substance or mixture of refractory substances and a high temperature bonding agent.

In the preferred embodiment of the invention, the low temperature bonding agent is a resin of a low degree of polymerization (or condensation) which polymerizes to a final insoluble infusible three-dimensional network in the presence of a catalyst, and accordingly a catalyst is also incorporated in the investment slurry.

The investment slurry containing both the low and high temperature bonding agents is poured around or against a previously prepared permanent or expendable pattern and the resin permitted to polymerize to such an extent that the investment composition will be set, i. e. the resin-bonded structure acquires sufficient strength to permit it to be handled so that the pattern can be removed and thereafter be subjected to firing. The setting time depends on the catalyst in the investment slurry. By adjustment of the catalyst, the resin can be made to polymerize to such an extent that the investment composition will set at exactly the time interval and temperature desired. After the investment has been set, the pattern is removed and the set refractory structure is subjected to a high temperature whereby it is brought into the final shape and condition necessary for use as a mold for precision metal casting. During the heating the resin is first polymerized to its final infusible three-dimensional network and thereafter it is partially burnt off as CO or $CO_2$ and partially decomposed to carbon. The high temperature bonding agent contained in the original investment becomes effective as a second stage of bonding after the resin has been converted to its final infusible state and during or after the burning off or decomposition thereof. This second stage bonding is stable even at the high temperatures required for casting steel and very high melting alloys.

The details and manner of practicing the invention will become apparent by reference to the following specific examples, it being understood that these examples are merely illustrative embodiments of the invention and that the scope of the invention is not restricted or limited thereto. Throughout the examples, the proportions of the ingredients are parts by weight unless otherwise specified.

*Example I*

340 grams fine silica flour were well dispersed in 125 cc. of 4½% aqueous phosphoric acid solution, and then a solution of 10 grams of a commercial, water-soluble melamine-urea-formaldehyde condensate in 10 cc. of water was added to the dispersion. After ten minutes additional stirring, the slurry so produced was poured into a flask containing an assembly of small wax patterns. After four hours, the slurry in the flask had set and no liquid had sweated out. The flask was put into a drying oven at 80° C. where the wax melted out and the investment gained considerable additional hardness. After two hours, the flask was transferred into an electrically heated muffle furnace and brought up to 850° C. in 3½ hours, and then kept at this temperature for an additional ½ hour. Steel castings produced from this mold on a centrifugal casting machine had a very smooth surface and showed accurate reproduction of the pattern. The mold material was reasonably strong yet easily removable.

*Example II*

510 grams fine silica flour were dispersed in 165 cc. of 5% aqueous phosphoric acid solution, and to this dispersion was added 50 grams of an aqueous solution containing about 70% of a melamine-formaldehyde resin. After stirring for ½ hour, this slurry was poured into a flask containing polystyrene patterns. Occluded air was then removed from the flask by vacuum. After 10 hours, the investment was set, the flask was separated from its base, dried for five hours at 85° C., and then fired slowly, reaching 800° C. in 7 hours and being left there one additional hour. The metal casting made from this mold, by pressure casting, was in every respect excellent, showing accurate reproductions and clean surface appearance.

*Example III*

340 grams silica flour were dispersed in 140 cc. of a 10% aqueous phosphoric acid solution, 17 grams of a commercial aqueous urea-formaldehyde solution, containing about 60% resin, were added, and two minutes after incorporation of the resin the slurry was poured into a flask containing an assembly of wax patterns. The flask was vibrated for three minutes. Fifteen minutes later the investment was set. After one additional hour, the base was stripped off the flask, the flask was put into a drying oven at 85° C. for three hours, and then transferred into a gas heated firing furnace where it was fired in six hours up to 800° C.

The brass castings produced in this mold on a centrifugal machine were smooth and sound, except for several small protrusions caused by insufficient removal of entrapped air from the slurry.

*Example IV*

Dilute phosphoric acid and ammonia were mixed in such proportions that the final solution contained .85 mol per liter of phosphoric acid and had a pH of about 2. 500 grams silica flour were dispersed in 170 cc. of this aqueous solution and 5% (i. e. 25 g.) of an aqueous solution of urea-formaldehyde (about 70% resin content) were added to the dispersion. After one hour, the viscosity of the slurry just began to increase and was poured into a flask containing wax patterns. After the usual evacuation in order to eliminate air from the flask, the flask was left at room temperature. After five hours, the slurry had set, the base was taken off the flask and the flask dried for five hours at 85° C., and then fired during nine hours up to 800° C.

Steel castings made from this mold were sound and of smooth surface, showing satisfactory reproduction of the pattern.

*Example V*

500 grams of silica flour were dispersed in 170 cc. of a 10% ammonium dihydrogen phosphate aqueous solution. 25 grams (5%) of an about 70% aqueous solution of a urea-formaldehyde resin were added to this slurry. A flask was poured and evacuated in the usual way. After twenty-four hours at room temperature, the slurry was set. It was then dried five hours at 85° C. and fired (in nine hours up to 750° C.) and used for centrifugally casting a cobalt-chromium-tungsten alloy into it. The castings were smooth and sound, showing satisfactory accuracy.

*Example VI*

340 grams silica flour were suspended in 120 cc. of 5% phosphoric acid solution, and then 20 cc. of a melamine-formaldehyde resin solution (50% resin content) were mixed into the supension. A flask containing polystyrene patterns was poured from this slurry in the usual way and immediately after evacuation put into a drying oven of 50° C. After four hours, the investment was firm and set, the base was taken off, and the flask put into the firing oven. The temperature reached 850° C. in five hours, and then steel was cast centrifugally into the mold so produced. The castings were sound and smooth.

In the examples, certain specific resins are disclosed as the low temperature bonding agent. It is, however, to be understood that the invention is not restricted to such specific resins. In general, a resin possessing the following characteristics can be used as the low temperature bonding agent:

(a) It must be capable of forming an extensively cross-linked three-dimensional network under the influence of proper catalysts at suitable temperature;

(b) It must be capable of existing in an intermediate degree of polymerization of substantially low molecular weight in which it has a certain amount of stability. Such low molecular weight form may extend to condensation products of two or three molecules only, for example, dimethylol urea;

(c) It, in the low molecular weight stage, should be either liquid or water-soluble to some extent, or both, in order to permit homogeneous incorporation into the aqueous slurry containing the refractory particles and the high temperature bonding agent.

The following are illustrative examples of commercially available resins which have been satisfactory:

Urea-formaldehyde of a low degree of condensation;

Melamine-formaldehyde of a low degree of condensation;

Urea-melamine-formaldehyde of a low degree of condensation;

Furane-formaldehyde of a low degree of condensation;

Phenol-formaldehyde of a low degree of condensation.

The resin can be incorporated in the investment composition, either in solid form or in liquid form, and at any stage during the compounding of the investment composition such as to the dry solids prior to their addition to water or to the slurry obtained after the addition of the dry solids to water. When the resin is added in liquid form, it may be liquid (pure) resin, an aqueous solution of the resin, or an aqueous emulsion of the resin. Irrespective of the form in which the resin is added, the conditions should be such that the resin is homogeneously distributed in the investment slurry. When the resin added is in solid form, the resin preferably should be of the type which dissolves in the aqueous medium of the investment slurry. In the preferred embodiment, especially with quick setting formulations, the resin is incorporated as the last ingredient of the aqueous investment slurry. Thus, an investment slurry of the usual type can be prepared and thereafter the resin incorporated therein.

In the specific examples, the resin in the investment slurry was present in an amount of from 3% to 7% based on the amount of refractory in the slurry. It is, however, to be understood that the quantity of resin based on the refractory content is not restricted to such specific proportions. In general, the amount of resin based on the refractory content of the slurry can be as low as ½% to as high as 30%, and preferably 2% to 15%.

The setting time of the investment slurry depends on the time required to polymerize the resin to a sufficiently high degree of polymerization to produce a resin-bonded structure having sufficient strength to permit it to be handled for the removal of the pattern and subjected to the necessary operations of drying and firing. The temperature at which the structure is dried after removal of the pattern may also further polymerize the resin. As shown in the examples, the time can vary within wide limits, such as 15 minutes at room temperature (Example III) to 24 hours at room temperature (Example V). In general, the setting time at any desired temperature can be varied at will from a relatively short time, such as 1 minute, to 2 days or longer, by adjusting the catalyst in the slurry so that the quantity of resin incorporated in the slurry will set at exactly the time interval and temperature desired. In the preferred embodiment, the temperature at which setting is obtained should be room temperature (20° C.), although it can be slightly elevated, such as 50° C.–60° C.

Herein "setting time" is defined as that time interval wherein the resin-bonded structure has acquired sufficient strength to permit it to be handled so that the pattern can be removed and which, upon subsequent firing, will produce precision casting molds of the required strength.

In the examples, the polymerization of the resin to its final state is catalyzed by the acidic nature of the investment slurry. The acidic nature of the investment slurry can be obtained by the incorporation therein of an acid or acid salt. In general, however, the acid or acid salt employed as the catalyst to impart the desired acidity to the investment slurry should not expend itself by reacting with the other components of the slurry or, in any event, not prior to the conversion of the resin to its final ultimate state. In the preferred embodiment of the invention, the acidity is obtained by means of an acid or acid salt containing the $PO_4$ radical and which also serves as the high temperature bonding agent. As previously described, the degree of acidity of the slurry depends on the temperature and desired setting time at such temperature and is not restricted to the degrees of acidity set forth in the specific examples.

Instead of acid catalysts, basic catalysts such as volatile bases, for example ammonia, which are eliminated before the high temperature bonding agent begins to be effective can be used. Ammonium salts of weak acids, such as ammonium phosphate with or without ammonia, can also be used.

The investment slurry can be of any of the known refractory compositions, such as graded particles of one or a mixture of refractory materials, such as powdered or fused oxides, and, for example, silica, magnesia, zirconia, zircon, chromite, etc., and a liquid vehicle, generally water, containing the high temperature bonding agent.

The usual high temperature bonding agent is, as previously described, phosphoric acid or an acid salt of phosphoric acid. It can also be a polybasic acid of an element of the 5th or 6th group of the periodic system or a soluble salt thereof, such as ammonium vanadate, tungstate, etc.

The strength of the set refractory can be varied at will by the quantity of resin employed. The slurry can be used in a liquid well-pourable consistency and obviates procedures such as precoating the pattern, slow many-stage filling of the mold, vibrating while pouring, and prolonged vibration thereafter, previously employed.

Surprisingly, a slurry containing, for example, silica flour, water, high temperature bonding agent and resin, will tolerate a higher silica flour content than a similar slurry free of resin. As a direct consequence of this, the setting time is decreased, shrinkage during setting is decreased, denser packing and therefore greater strength is achieved, and the tendency to crack is minimized.

This invention provides an investment composition which can be used either in the expendable patterns method or in the permanent pattern method which previously utilized plaster molds for making refractory molds and which can be set at a predetermined temperature in a predetermined period of time. In producing the mold, there are two stages of bonding, the first effected by low temperature bonding agent, and the second by the high temperature bonding agent. When the second stage bonding action is effected, the resin of the first stage bonding is partially burnt off as CO or $CO_2$ and partially decomposed to carbon which will not only permeate the refractory body but a layer thereof will be on the surface of the mold to be exposed to molten metal during the casting of the latter. This layer of carbon obtained by firing at 300° C.–600° C. serves as a medium for parting the mold from the metal casting and improves the surface appearance and mechanical surface characteristics of the metal castings. For example, it prevents decarburization on the surface of steel castings which frequently occurs in other types of molds due to oxidizing conditions prevalent at the interface of the casting and mold. Molds which have been fired to 300° C.–600° C. are preferably used in connection with the permanent pattern molding process. For precision casting the firing is carried out at a temperature of about 1000° C. and all the carbon burnt off.

Herein "low temperature" is intended to define a temperature of from about room temperature (20° C.) to a temperature up to about 60° C. at which the refractory is set. Also, herein, "high temperature" is intended to define that temperature at which the set refractory is finally heated or fired to bring it into its final condition and which is generally in excess of 250° C., such as 350° C.–1000° C., or higher.

Herein, also, the expression "a resin of low degree of polymerization" is intended to cover a resin obtained by partial polymerization, partial condensation, etc. and of a degree of polymerization which is lower than that necessary for the resin to be in its final ultimate infusible and insoluble state.

Since it is obvious that various changes and modifications may be made in the above description without departing from the nature or spirit thereof, this invention is not restricted thereto except as set forth in the appended claims.

I claim:

1. A method of making a refractory mold for precision metal casting, which comprises pouring into the desired shape and form a mold composition which consists essentially of an aqueous slurry of particles of refractory flour containing (1) a low temperature bonding agent which is capable of bonding the refractory particles at a low temperature, said low temperature bonding agent comprising a synthetic, thermosetting resin of a low degree of polymerization and which in the presence of a catalyst will be polymerized to such an extent that the investment composition will be set, (2) a catalyst to effect the polymerization of said resin, and (3) a high temperature bonding agent which becomes effective to bond the refractory particles when the set refractory is subjected to a high temperature, causing the resin to polymerize in the presence of said catalyst at a low temperature to set the composition in the presence of water, removing the pattern, and firing the set composition at a temperature above that at which the high temperature bonding agent becomes effective and sufficiently high to decompose the resin.

2. The method set forth in claim 1 in which the refractory substance comprises silica flour.

3. The method set forth in claim 1 in which the firing is carried out under conditions to carbonize the decomposed resin and cause the carbon to form a layer on the surface of the refractory which is to be exposed to molten metal.

4. The method set forth in claim 1 in which the catalyst comprises an acidic composition.

5. The method set forth in claim 4 in which the acidic catalyst comprises a substance containing the $PO_4$ radical.

6. The method set forth in claim 4 in which the acidic catalyst comprises dilute phosphoric acid.

7. The method set forth in claim 1 in which the resin comprises a formaldehyde condensation product.

8. The method set forth in claim 1 in which the resin comprises a urea formaldehyde condensation product.

9. The method set forth in claim 1 in which the resin comprises a melamine formaldehyde condensation product.

10. The method set forth in claim 1 in which the resin comprises a phenol formaldehyde condensation product.

11. A method of making a refractory mold for precision casting as set forth in claim 1, wherein a water-soluble compound containing the $PO_4$ radical constitutes and serves as both the acid catalyst and the high temperature bonding agent.

12. A pourable mold composition capable of being formed into the desired shape by casting, setting and exposure to heat, said mold composition consisting essentially of an aqueous slurry of particles of refractory flour containing sufficient water to impart pourability, a low temperature bonding agent in an amount to be capable of bonding the refractory particles at a temperature between 20° C. and 60° C., said low temperature bonding agent comprising a synthetic thermosetting resin of a low degree of polymerization which in the presence of a catalyst will be polymerized to such an extent that the mold composition will be set in the presence of said water and which will be decomposed at high temperatures, a catalyst in solution in said water to effect the polymerization of said resin, and a high temperature bonding agent in solution in said water, in an amount of at least the equivalent of 1.6 g. $H_3PO_4$ per 100 g. of the refractory flour, to effectively bond the refractory particles when the set composition is subjected to a temperature in excess of 250° C.

13. A mold composition as set forth in claim 12, in which the refractory substance comprises silica flour.

14. A mold composition, as set forth in claim 12, in which the refractory substance comprises zirconia.

15. A mold composition, as set forth in claim 12, in which the refractory substance comprises zircon.

16. A mold composition, as set forth in claim 12, in which the catalyst is an acidic composition.

17. A mold composition, as set forth in claim 16, in which the acidic catalyst comprises a water-soluble compound containing the $PO_4$ radical.

18. A mold composition, as set forth in claim 17, in which the acidic catalyst containing the $PO_4$ radical comprises dilute phosphoric acid.

19. A mold composition, as set forth in claim 12, in which the resin comprises a formaldehyde condensation product.

20. A mold composition, as set forth in claim 12, in which the resin comprises a urea formaldehyde condensation product.

21. A mold composition, as set forth in claim 12, in which the resin comprises a melamine formaldehyde condensation product.

22. A mold composition, as set forth in claim 12, in which the resin contains a phenol formaldehyde condensation product.

23. A mold composition as set forth in claim 12 in which the high temperature bonding agent is phosphoric acid.

24. A mold composition as set forth in claim 12 in which both the catalyst and the high temperature bonding agent are phosphoric acid.

ILSABE E. VALYI.

REFERENCES CITED

The following references are of record in the file of this patent:

UNITED STATES PATENTS

| Number | Name | Date |
|---|---|---|
| 1,531,871 | Nagel | Mar. 31, 1925 |
| 1,751,482 | Leasman | Mar. 25, 1930 |
| 1,777,996 | Dent | Oct. 7, 1930 |
| 2,054,894 | Busch | Sept. 22, 1936 |
| 2,233,702 | Grossman | Mar. 4, 1941 |
| 2,322,638 | Kleeman | June 22, 1943 |
| 2,322,667 | Seastone | June 22, 1943 |
| 2,381,735 | Santz | Aug. 7, 1945 |
| 2,383,812 | Navias | Aug. 28, 1945 |

FOREIGN PATENTS

| Number | Country | Date |
|---|---|---|
| 303,858 | Great Britain | Nov. 21, 1929 |
| 118,781 | Austria | Aug. 7, 1944 |